UNITED STATES PATENT OFFICE.

P. S. DEVLAN, OF JERSEY CITY, NEW JERSEY.

IMPROVED COMPOSITION FOR LINING JOURNAL-BOXES.

Specification forming part of Letters Patent No. 51,700, dated December 26, 1865.

*To all whom it may concern:*

Be it known that I, PATRICK S. DEVLAN, of Jersey City, county of Hudson, and State of New Jersey, have invented a new Composition of Matter to be Used as a Lining for Journal-Boxes and other Rubbing-Surfaces; and I do hereby declare that the following is a full, clear, and exact description thereof.

My said invention consists of a combination of vegetable fiber, plumbago, (graphite,) soapstone, and gum, or bitumen as an equivalent for gum.

For the preparation of my said compound I take eight parts, by weight, of vegetable fiber, (by preference in the state of pulp such as prepared for making paper,) two parts of plumbago, (graphite,) one part of soapstone, and eight parts of any of the gums which are insoluble in oil, or, as an equivalent, eight parts of any of the resinous gums or any of the bituminous varnishes. If gum is to be used, it should first be dissolved by any of the known solvents. The ingredients are to be thoroughly mixed until the mass is reduced to a plastic or putty-like state, and in that condition applied as a lining to journal-boxes and other rubbing-surfaces.

I have found it best to prepare the surfaces to be lined with cavities, into which the compound in the plastic state is put of a sufficient thickness, so that when pressure is applied to compress it and render the surface smooth it will spread over any desired extent of the surface to be lined.

I have discovered that this composition prevents heating and greatly reduces friction.

What I claim as my invention, and desire to secure by Letters Patent, as a lining for journal-boxes and other rubbing-surfaces, is—

The composition, substantially as herein described, and consisting of vegetable fiber, plumbago, soapstone, and gum, or the equivalent of the latter, as set forth.

P. S. DEVLAN.

Witnesses:
ANDREW DE LACY,
WM. H. BISHOP.